Jan. 12, 1971 W. BROWN 3,554,579
FLOWLINE CONNECTOR
Filed June 27, 1969 2 Sheets-Sheet 1
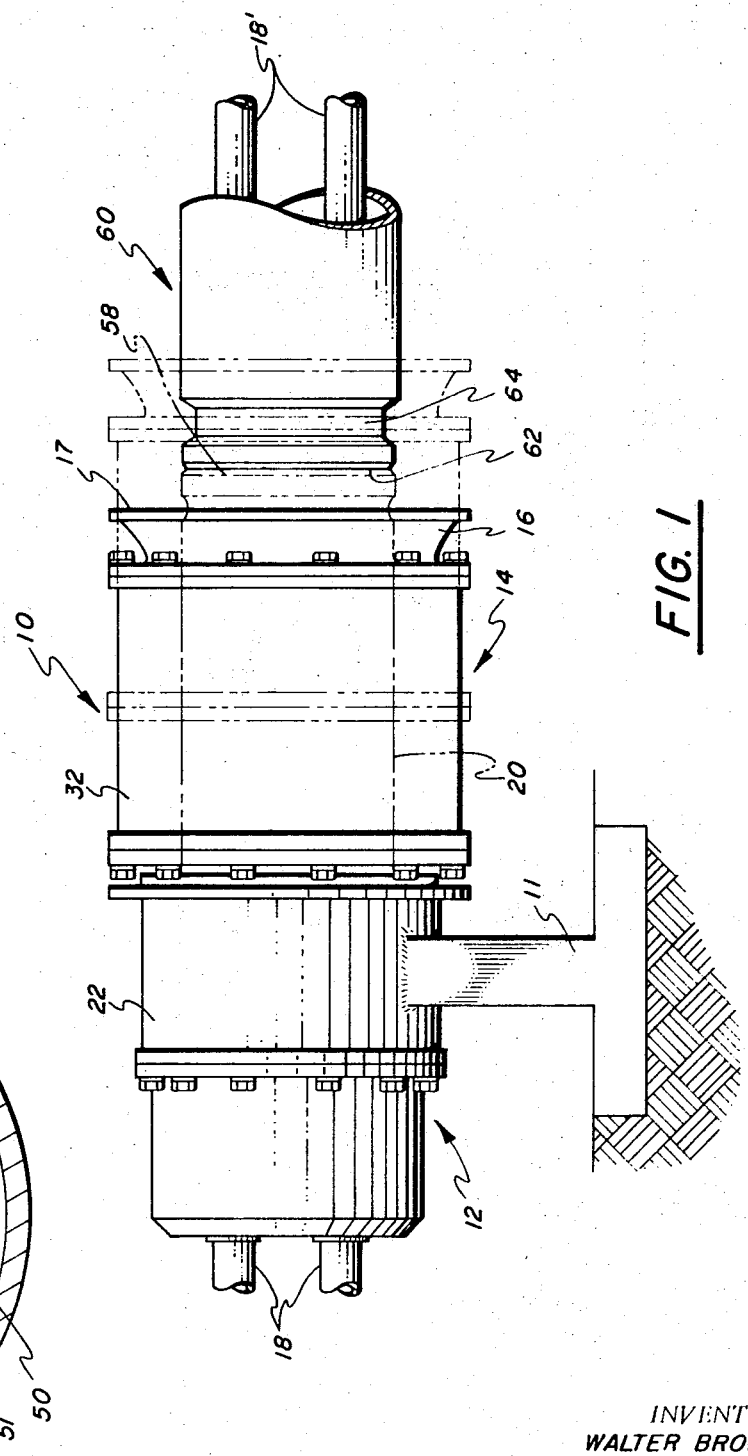
INVENTOR.
WALTER BROWN
BY Thomas S. Macdonald
ATTORNEY

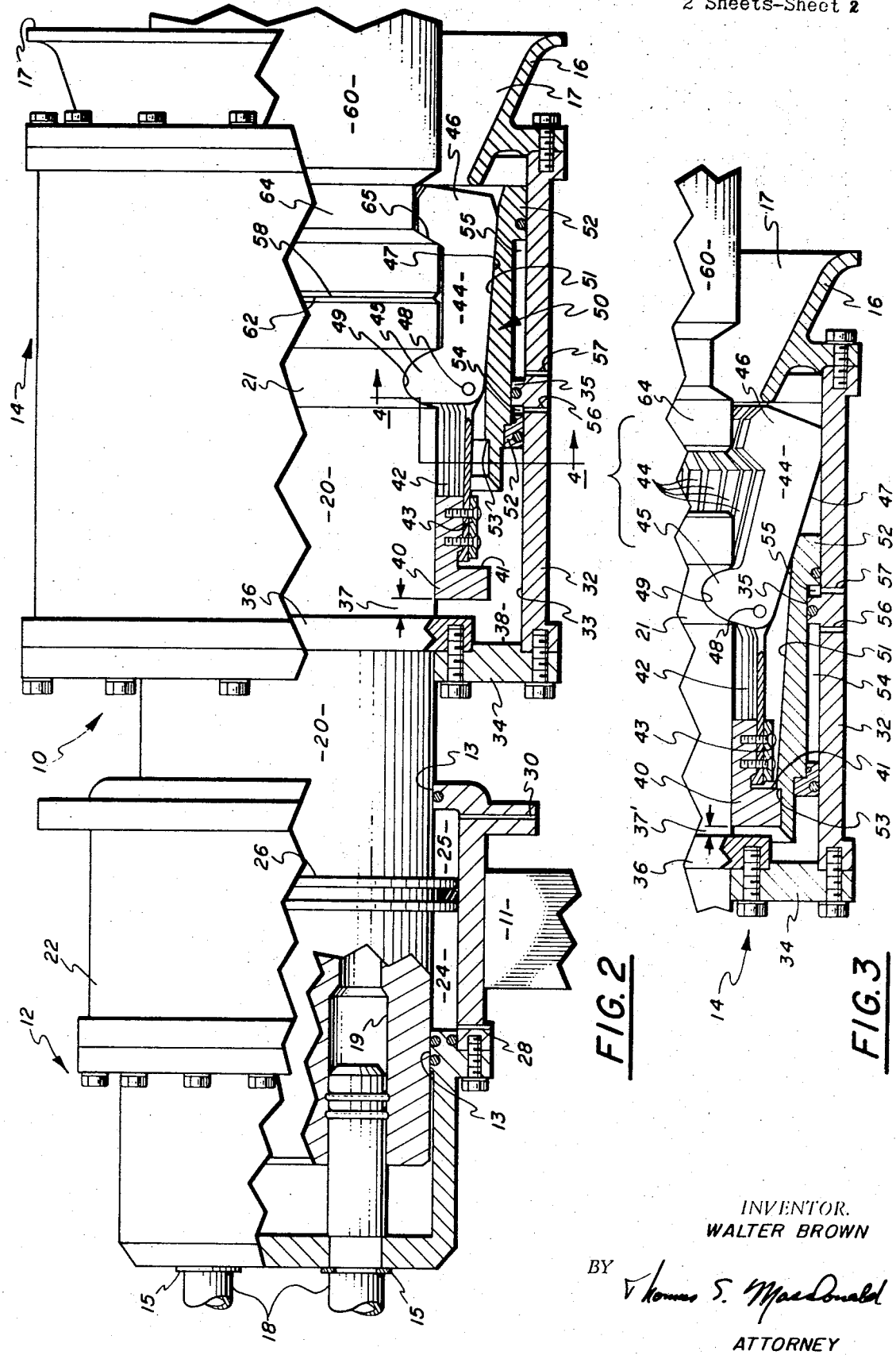

United States Patent Office 3,554,579
Patented Jan. 12, 1971

3,554,579
FLOWLINE CONNECTOR
Walter Brown, Long Beach, Calif., assignor to North American Rockwell Corporation, a corporation of Delaware
Filed June 27, 1969, Ser. No. 837,083
Int. Cl. F16l 35/00, 55/00
U.S. Cl. 285—18                                    8 Claims

ABSTRACT OF THE DISCLOSURE

A remotely operable flowline connector comprises a plurality of latch-type elements, each element having at one end a rounded lobe and at the other end a latching finger. Within the connector body the elements are swively retained by an equal number of spring members which axially extend from a slidable ring. The spring members bias the lobe end of the latch members in a groove in the connector body. A hydraulically operable piston engages a lip on the ring member to positively bias or rock the latch members radially outwardly in an unlatched position which accepts the "stinger" or pipe end while in the reverse position, the inner walls of the piston engage the outer surface of the latch members thus locking them in a groove in the flowline pipe.

BACKGROUND OF THE INVENTION

Underwater flowline connectors have been utilized in the oil industry for a number of years. These connectors must operate under a variety of environmental conditions totally different than in dry land oil drilling operations. In recent years the oil drilling industry has ventured further and further into the ocean in search of new oil fields. These fields have been located at depths far too deep for deep sea divers, hence drilling methods had to be revised to automatically perform certain operations normally done manually. The connection or coupling of flowline pipes fall in this category.

There are a number of flowline connectors in the prior art that are currently being used to remotely connect pipes at ocean depths. The Cameron connector made by the Cameron Iron Works, Houston, Tex., is a typical example. The connector bears Pat. No. 3,096,999 and is suitable for automatic coupling of flowline pipes. This connector has a series of latching fingers that rock radially outwardly when an outer sleeve is axially moved upwardly. The connector is then ready to receive a pipe. When the connecting "stinger" or pipe makes contact with a mating surface within the connector, the outer sleeve is driven downwardly over the surface of the latching fingers thereby rocking the latching fingers radially inwardly into a groove in the "stinger" thus locking or securing the coupling. This operation is typically performed in a vertical position. A similar connector is made by the Rockwell Manufacturing Company, McEvoy Plant, Houston, Tex. This connector utilizes a series of latching fingers circumferentially disposed about a connector body in much the same manner as the Cameron connector previously described. This connector, too, is best suited for vertical engagement with a flowline pipe.

Still another prior art flowline connector is made by the National Supply Division of National Steel Corporation Steel Corporation, Houston, Tex. This connector has a series of wedge-type members or snap ring segments that are disposed about the periphery of a connector body. When a stinger is contacted, its end contacts a mating surface within the connector body which aligns a groove in the stinger with the wedge members. A sleeve axially moves down the connector body and over the outside surface of the wedge members thereby driving them into the recess or groove in the connecting pipe, thus coupling it with the connector body.

All but the last of the aforementioned prior art connectors are hindered by the same basic problem. It should be noted that the connectors are designed to be utilized primarily in the vertical position. If the connectors (with the exception of the Armco connector) are positioned horizontally and the latching fingers are in a position between opened and closed, those fingers which are located on top tend to fall down by gravity thus interfering with the coupling operation.

The Armco device suffers from a slightly different problem. The wedges or snap segments ride on sliding surfaces which work well when used frequently; however, if it should be decided to uncouple the connector after months or years of exposure to the ocean environment, it would be extremely difficult or impossible to actuate the connectors due to the accumulation of foreign matter and the corrosive action on the sliding surfaces.

Therefore, it is an object of this invention to provide a remotely operable flowline connector for undersea oil well operations.

More particularly, it is an object of this invention to provide a remotely operable flowline connector which can be utilized on any plane including a horizontal plane without fear of malfunction due to loosely suspended latching fingers.

SUMMARY OF THE INVENTION

The present invention is a remotely operable latch-type connector adapted to couple flowline pipes which comprises a plurality of latch members that are rockably mounted on a pipe connector and have hooks at their free ends which engage a flange or groove on the connecting pipe near its end to establish a coupling. Each latch member is formed with a rounded ear or lobe received in a similarly rounded groove in the connector pipe in which it rides. A spring arm is connected at one end to the lobe of each latch member radially outwardly of the groove and at its other end to a ring slidable on the connector pipe. The ring has an outwardly extending flange around its periphery. Between the housing and the latch members is a slidable piston designed to move hydraulically. In one position the piston engages the outwardly extending flange of the spring retaining ring to slide the ring back, which in turn forces the latch member to open or rock radially outwardly due to the fulcrum action of the anchored lobe end and the pivot point which is located radially outwardly from the rounded groove. This action releases or breaks the pipe coupling connection. In the other position the inner piston moves away from the sliding ring thereby allowing the ring to move forward, thus allowing the latching finger to rock inwardly. The piston wall forces the latch member radially inwardly towards a closed or latched position, thus locking the connecting pipe member in place. The inner wall of the piston is tapered with relation to the piston centerline with an angle of taper smaller than the friction angle, so that when the connector is in a latched position and the hydraulic pressure is removed from the piston, the piston will not move away from the locked position.

The latching connector assembly can be remotely operated from, for example, a surface ship during undersea drilling operations by bringing to the surface the hydraulic lines that actuate various functions of the connector assembly. Because the piston moves the ring rearwardly, the spring positively biases the latching fingers in an opened position. The latching fingers are forced radially outwardly, therefore gravity cannot affect those latching fingers which are located on top, thus the connector may be positively operated regardless of the position of the connector and adjacent pipe to be coupled therewith. The connector and flowline pipe need not be aligned vertically as is the case for most prior art pipe connector devices.

DESCRIPTION OF THE DRAWINGS

The above noted objects and further advantages of the present invention will be more fully understood upon the study of the following detailed description in conjunction with the detailed drawings in which:

FIG. 1 is a plan view of the connector in the environment in which it will be used, including one alternate position of the coupling end of the device;

FIG. 2 is a partially cutaway plan view of the connector in the closed latched position;

FIG. 3 is a partially cutaway plan view of the connector in the open unlatched position; and FIG. 4 is a section taken along lines 4—4 of FIG. 2.

Referring now to FIG. 1, the remotely operable connector generally designated as 10 consists basically of an aft fixed section 12 and a forward translatable section 14. The connector body 12 is typically firmly anchored horizontally to, for example, the ocean floor or to any part of an oil well structure located beneath a body of water as indicated by support structure 11. The forward section 14 of connector 10 is attached to inner cylinder 20 and is translatable inwardly and outwardly hydraulically from section 12. This operation will be more specifically described in reference to FIGS. 2 and 3. At the forward end of section 14 is a guide funnel 16 designed to guide the stinger or flowline pipe 60 into the mouth 17 of connector 10. Within fixed body 12 is one or more flowline pipes 18 which mate with an equal number of pipes 18' within stinger 60. Means (not shown) are provided to align these pipes 18' in stinger 60 with the pipes 18 in connector 10. To couple the connector 10 with stinger 60, the stinger is first aligned adjacent the connector. The forward section 14 is moved toward the end of stinger 60. Funnel 16 guides the end of the stinger into the mouth 17 of the connector 10. Body 14 continues (as shown in the alternate position) over the stinger until the face 62 contacts a mating surface 58 in connector 10. When this occurs another independent hydraulic action within forward section 14 locks a series of latching fingers (FIGS. 2 and 3) in groove 64 of stinger 60 thereby coupling the stinger with the connector.

Referring now to FIG. 2, the partially cutaway section reveals the means by which the forward section 14 moves in and out of anchored section 12 of connector 10. Cylinder 20 bears on lands 13 which protrude inwardly from casing 22. Between lands 13 is a flange 26 extending radially outwardly from cylinder 20. A pair of chambers 24 and 25 are separated by the piston 26. The chambers are defined by the outer surface of cylinder 20, the inner surface of casing 22 and the inner faces of lands 13. Communicating with each of the chambers 24, 25 is a pair of hydraulic ports 28, 30. To move cylinder 20 which supports forward section 14 outwardly, hydraulic pressure is forced into chamber 24 through port 28. Obviously, since the flowline pipes 18 are secured by snap ring 15 to the fixed section 12, the end of flowline pipe 18 slides within bore 19 in cylinder 20 when section 14 is moved outwardly. A pair of O-ring seals are provided on pipe 18 to prevent leakage.

Forward section 14 comprises a connector actuator shell 32 which is anchored circumferentially about base plate 34. Base plate 34 is attached to radially extending flange 36 which is an integral part of cylindrical member 20. Nearest the mating face or end 58 of cylinder 20 is a rounded annular groove 21. The groove 21 is designed to anchor a plurality of latching fingers generally designated as 44. The latching fingers comprise at one end, a rounded or lobe end 45 which extends radially inwardly into groove 21. The other end consists of a radially inwardly extending latching finger which is designed to engage an annular recess 64 in a flowline pipe or stinger 60. Each latching finger 44 is swivelly coupled to a spring member 42 at pivot 48. Each spring is attached to a sliding ring member bearing the generic number 40. The plurality of springs are locked into member 40 by an outer retaining ring 43 which is screwed to the ring 40. The annular chamber 38, in addition to housing the latching fingers 44, includes piston 50. The cylindrical piston 50 rides on a pair of outwardly extending lands 52 which slide on the inner surface 33 of housing 32. A pair of annular chambers 54 and 55 are separated by flange 35 extending radially inwardly from shell 32. These chambers communicate with hydraulic ports 56 and 57. A shoulder 53 on the aft inner surface 51 of the piston 50 is provided to contact shoulder 41 of ring 40 when the piston is hydraulically driven axially rearwardly as seen in FIG. 3. To drive the piston in a rearward direction hydraulic fluid is pumped into chamber 54 via port 56 and out of chamber 55 via port 57 which could be, for example, a remotely operable closed loop hydraulic pumping system (not shown). The piston 50 moves back until shoulder 53 contacts shoulder 41 of ring 40. Further movement of the piston forces the ring to slide back which, in turn, starts to rock the latching fingers 44 towards an unlatched position.

The space 37 between the ring 40 and the extending flange 36 of FIG. 2 is considerably lessened in FIG. 3 (37') when the piston 50 slides ring 40 back. Thus, it can be seen that the spring members are in tension when the connector is in the unlatched position.

The distance between the seat 49 and the pivot 48 creates a fulcrum action which, when the piston surface 51 slides away from surface 47 by virtue of the rearward motion of the piston 50, the latching finger 44 simultaneously cooperates to cause the latching end 46 of the fingers 44 to rock radially away from their seat 65 in groove 64 of stinger 60, thereby unlatching the pipe coupling. Since the rearward motion of the ring causes the latching fingers to be biased radially outwardly, they cannot fall loosely back to cause an interfering problem due to any gravitational action or the like.

FIG. 3 is a partial cutaway of the forward section 14 of connector 10. This view shows the connector in an unlatched condition. Piston 50 is in a rearward position and shoulder 53 is in contact with shoulder 41 of ring 40 thus forcing the ring axially back far enough to positively rock latching fingers 44 radially outwardly so that the stinger 60 can pass in or out of opening 17 of funnel 16 without interfering with the latching fingers 44.

FIG. 4 is a section taken through FIG. 2 to more clearly illustrate the individual spring members 42 which are pivotably connected to the latching fingers 44 at pivot 48. The shoulder 53, sliding surface 51 and the rearward lands 52 of piston 50 are also more clearly defined in this view.

In operation, the connector 10 is normally mounted to, for example, an oil well head or satellite for the purpose of connecting flowline pipes which are positioned on the bottom of the ocean. The connectors, for the purpose just described, are mounted in a horizontal position to accommodate the horizontally positioned flowline pipes. The pipe to be coupled is positioned near the mouth 17 of connector 10. The anchored portion 12 is hydraulically actuated remotely to move the translatable section 14 over the end of the stinger 60 as previously described. When the face 62 of stinger 60 and the face 58 of the inner cylinder 20 come together, the piston is hydraulically actuated which moves surface 51 of the piston 50 over the outer surface 47 of latching fingers 44, thereby locking the fingers into groove 64 of stinger 60 thus firmly coupling the stinger to the connector. With the taper of the inner piston surface 51 being smaller, or less than surface 47 of latching finger 44, the friction becomes greater as the piston advances thus the piston will remain locked into position even though the hydraulic pressure is removed from chamber 55.

I claim:
1. A pipe connector adapted to latch a grooved pipe end, said connector comprising;
   a cylindrical member adapted to be axially aligned with a grooved pipe end,
   said cylindrical member having means thereon forming a circumferential groove adjacent one end thereof,
   an open-ended housing connected to and surrounding said cylindrical member forming a latching annulus therebetween,
   an axially aligned latching assembly between said member and said housing in said annulus, said assembly including,
      a ring surrounding said member,
      a plurality of axially aligned latching fingers each having a lobe extending radially inwardly into said circumferential groove and a radially inwardly extending free end engageable with the means forming the groove of said pipe end,
      a plurality of spring means fixedly connected to said ring and pivotably connected to each of said latching fingers, and
      piston means operable axially (1) in a first direction to translate said ring axially and to rock said lobe in said circumferential groove and pivot said latching fingers radially outwardly to an unlatched position and (2) in an opposite direction to drive said latching fingers radially inwardly for engagement of the free ends thereof with the groove of said pipe end.

2. The invention of claim 1 wherein said lobe and said circumferential groove have complementary curvatures whereby the lobe pivotally seats to the contour of the groove.

3. The invention of claim 2 wherein the plurality of spring means pivotally connected to each of said latching fingers connects at the lobe end of said fingers radially outwardly from said pivotable seat of said lobe to cause said latching fingers to rock radially outwardly when said spring means are under tension.

4. The invention of claim 1 wherein said piston means is operable axially by ingressing or egressing fluid under pressure through a first port in said open-ended housing into a first chamber defined by a wall of said piston and the inner periphery of said housing and egressing or ingressing fluid through a second port in said housing communicating with a second chamber defined by a wall of said piston and inner housing periphery.

5. The invention of claim 1 including an inner annular shoulder on said piston means and an outer annular shoulder on said ring surrounding said cylindrical member whereby force on said inner shoulder against said outer shoulder translates said ring axially in said first direction.

6. The invention of claim 1 wherein the distance from said lobe and the radially inwardly extending free end of the latching fingers corresponds to the distance from the circumferential groove in the end of said cylindrical member to the groove of said pipe end when the cylindrical member and the pipe end are mated.

7. A flowline pipe connector, said connector comprising;
   a fixedly supported first housing,
   a cylindrical member within and extending from said first housing,
   a cylindrical stinger substantially axially aligned with the extended end of said cylindrical member,
   means forming a circular groove in the stinger adjacent the end of the stinger facing said cylindrical member,
   means formed in said first housing to axially translate said cylindrical member into mating position with said stinger,
   said cylindrical member having means thereon formnig a rounded circumferential groove adjacent the extended end thereof,
   a second open-ended housing connected to and surrounding said axially translatable cylindrical member at the groove end forming a latching annulus between the cylindrical member and the second housing,
   an axially aligned latching assembly between said cylindrical member and said second housing in said annulus, said assembly including,
      an axially translatable ring surrounding said member,
      a plurality of axially aligned latching fingers each having a rounded lobe which seats pivotally radially inwardly into engagement with the means forming the said rounded circumferential groove and a radially inwardly extending free end engageable with the means forming the groove of said stinger when said stinger is mated with said cylindrical member within said second housing,
      a plurality of spring means fixedly connected to said ring and pivotably connected radially outwardly of the lobe end of each of said latching fingers, and
      piston means operable axially (1) in a first direction to translate said ring axially to rock said lobe in said rounded circumferential groove and to pivot said latching fingers radially outwardly to an unlatched position and (2) in an opposite direction to drive said latching fingers radially inwardly for engagement of the free ends thereof with the circular groove of said stinger when the stinger and cylindrical member are mated.

8. The invention of claim 7 wherein the translatable means formed in said first housing for translating said cylindrical member into mating position with said stinger comprises a second piston means extending radially outwardly from said cylinder, said second piston means forming a sliding seal on the inner walls of said first housing whereby fluid under pressure on opposite sides of said second piston means translates said cylindrical member within said first housing.

References Cited

UNITED STATES PATENTS

| | | | |
|---|---|---|---|
| 3,096,999 | 7/1963 | Ahlstone et al. | 285—24 |
| 3,321,217 | 5/1967 | Ahlstone | 285—18 |
| 3,419,071 | 12/1968 | Williams et al. | 166—0.6 |

DAVE W. AROLA, Primary Examiner

U.S. Cl. X.R.

285—302, 315, 320; 166—0.6